(12) United States Patent
Hardee et al.

(10) Patent No.: US 10,375,619 B2
(45) Date of Patent: Aug. 6, 2019

(54) METHODS AND SYSTEMS FOR MANAGING MOBILE DEVICES WITH REFERENCE POINTS

(71) Applicant: INTERNATIONAL BUSINESS MACHINES CORPORATION, Armonk, NY (US)

(72) Inventors: Christopher J. Hardee, Raleigh, NC (US); Shikhar Kwatra, New York City, NY (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/493,286

(22) Filed: Apr. 21, 2017

(65) Prior Publication Data
US 2018/0310224 A1 Oct. 25, 2018

(51) Int. Cl.
*H04W 24/00* (2009.01)
*H04W 40/20* (2009.01)
*H04W 4/02* (2018.01)

(52) U.S. Cl.
CPC .......... *H04W 40/20* (2013.01); *H04W 4/023* (2013.01)

(58) Field of Classification Search
CPC ..... H04W 4/021; H04W 4/027; H04W 4/028; H04W 4/12; H04W 52/0254; H04W 64/00; H04W 64/006; H04W 76/027; H04W 88/02

USPC ... 455/412.1, 418, 456.2, 456.1, 435.1, 433, 455/410, 41.1, 411, 523, 420
See application file for complete search history.

(56) References Cited

U.S. PATENT DOCUMENTS

| | | | |
|---|---|---|---|
| 9,277,365 B1* | 3/2016 | Wilden | H04W 4/028 |
| 9,754,491 B2* | 9/2017 | Del Vecchio | G08G 1/205 |
| 2008/0057939 A1* | 3/2008 | Choi-Grogan | H04W 68/02 455/425 |
| 2008/0057955 A1* | 3/2008 | Choi-Grogan | H04W 8/04 455/435.1 |
| 2010/0069089 A1* | 3/2010 | Wang | G01S 5/14 455/456.1 |
| 2010/0144368 A1* | 6/2010 | Sullivan | H04W 4/02 455/456.2 |
| 2011/0228753 A1* | 9/2011 | Polito | G01S 5/0221 370/338 |
| 2012/0330544 A1* | 12/2012 | Joong | G01C 21/3605 701/408 |

(Continued)

*Primary Examiner* — Joseph Arevalo
(74) *Attorney, Agent, or Firm* — Griffiths & Seaton PLLC

(57) ABSTRACT

Embodiments for managing mobile devices by one or more processors are described. A plurality of mobile devices are detected at a first location. After the plurality of mobile devices are detected at the first location, a first of the plurality of mobile devices is detected traveling to a second location while a second of the plurality of mobile devices remains at the first location. In response to the plurality of mobile devices being detected at the first location and the first of the plurality of mobile devices being detected traveling to the second location while the second of the plurality of mobile devices remains at the first location, data detected by the second of the plurality of mobile devices at the first location is enabled to be transmitted to the first of the plurality of mobile devices at the second location.

15 Claims, 7 Drawing Sheets

(56) References Cited

U.S. PATENT DOCUMENTS

| | | | |
|---|---|---|---|
| 2013/0304349 A1* | 11/2013 | Davidson | G08G 1/0112 |
| | | | 701/99 |
| 2014/0282068 A1* | 9/2014 | Levkovitz | G06Q 20/223 |
| | | | 715/748 |
| 2015/0111550 A1 | 4/2015 | Kaye et al. | |
| 2016/0112472 A1 | 4/2016 | Pugalia et al. | |
| 2016/0205154 A1* | 7/2016 | Huang | H04L 65/403 |
| | | | 709/204 |

\* cited by examiner

METHODS AND SYSTEMS FOR MANAGING MOBILE DEVICES WITH REFERENCE POINTS

BACKGROUND OF THE INVENTION

Field of the Invention

The present invention relates in general to computing systems, and more particularly, to various embodiments for managing mobile devices.

Description of the Related Art

In recent years, mobile electronic devices (or mobile devices), such as cellular/mobile/smart phones, personal digital assistants (PDAs), and tablets, have become widely used to the point that many people now have such a device with them at all times. These devices are able to assist users is a multitude of ways in their daily lives, such as with respect to communication, internet access, scheduling, and entertainment.

As the technology continues to improve, there is an ever-increasing need to improve the functionality, flexibility, and overall usefulness of mobile devices in the daily lives of users, such as with respect to users leaving important events, such as meetings, perhaps unexpectedly.

SUMMARY OF THE INVENTION

Various embodiments for managing mobile devices by one or more processors are described. In one embodiment, by way of example only, a method for managing mobile devices, again by one or more processors, is provided. A plurality of mobile devices are detected at a first location. After the plurality of mobile devices are detected at the first location, a first of the plurality of mobile devices is detected traveling to a second location while a second of the plurality of mobile devices remains at the first location. In response to the plurality of mobile devices being detected at the first location and the first of the plurality of mobile devices being detected traveling to the second location while the second of the plurality of mobile devices remains at the first location, data detected by the second of the plurality of mobile devices at the first location is enabled to be transmitted to the first of the plurality of mobile devices at the second location.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
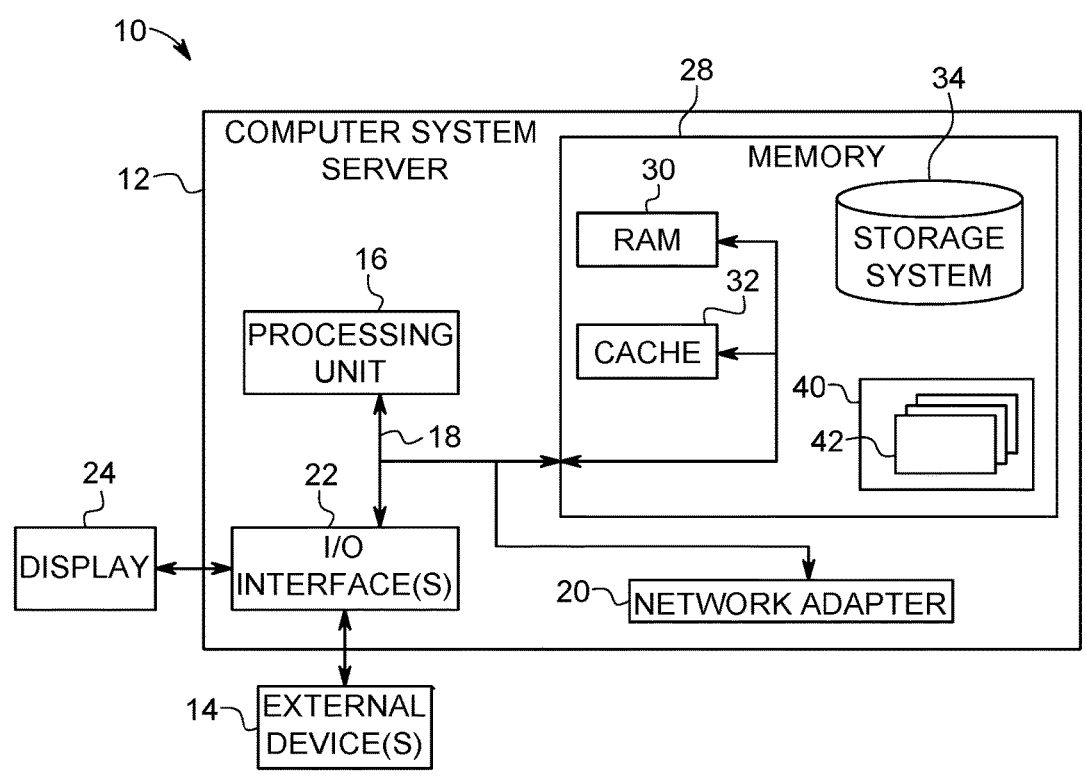
FIG. 1 is a block diagram depicting an exemplary computing node according to an embodiment of the present invention.

As previously indicated, there is an ever-increasing need to improve the functionality, flexibility, and overall usefulness of mobile devices in the daily lives of users, such as with respect to users leaving important events, such as meetings, perhaps unexpectedly.

Consider an example in which a user is taking part in an important business meeting at a particular location, such as a conference room. In the event that the user has to leave the meeting, perhaps unexpectedly, before it ends, in order for the user to be able to continue to observe and/or participate in the meeting, he/she may have to, for example, place a phone call using his/her mobile phone to be connected with, for example, the mobile phone (or other similar device) of another person still at the meeting. Although doing so may allow the user to continue to participate in the meeting, the act of receiving the call by the user still at the meeting may be rather conspicuous and may be considered inappropriate.

In view of the foregoing, a need exists for methods and systems that allow users of computing systems, such as mobile devices, to more seamlessly initiate communication between devices when one device (and/or the user thereof) leaves, or is not present at, a particular location or event.

To address these needs, the methods and systems of the present invention, for example, detect the presence of multiple mobile devices at a particular location and may set that location as an "audio (and/or video) reference point." If any of the mobile devices (and/or the users thereof) is detected as leaving the location while, for example, the majority of the other mobile devices remain at the location, the transmission of data (audio and/or video data) between at least one of the mobile devices still at the location and the mobile device(s) that has left the location is initiated (or enabled), perhaps seamlessly and/or automatically. That is, in some embodiments, the transmission of data is initiated without any active input from any of the users (e.g., placing a phone call).

In one embodiment, a method for managing mobile devices by one or more processors is provided. A plurality of mobile devices are detected at a first location. After the plurality of mobile devices are detected at the first location, a first of the plurality of mobile devices is detected traveling to a second location while a second of the plurality of mobile devices remains at the first location. In response to the plurality of mobile devices being detected at the first location and the first of the plurality of mobile devices being detected traveling to the second location while the second of the plurality of mobile devices remains at the first location, data detected by the second of the plurality of mobile devices at the first location is enabled to be transmitted to the first of the plurality of mobile devices at the second location.

The detecting of the plurality of mobile devices at the first location may include detecting the plurality of mobile devices within a predetermined distance of each other. The data detected by the second of the plurality of mobile devices at the first location may include at least one of audio data or video data.

In response to the detecting of the plurality of mobile devices at the first location and the detecting of the first of the plurality of mobile devices traveling to the second location while the second of the plurality of mobile devices remains at the first location, data detected by the first of the plurality of mobile devices at the second location may be enabled to be transmitted to the second of the plurality of mobile devices at the first location.

The transmission of the data detected by the second of the plurality of mobile devices at the first location to the first of the plurality of mobile devices at the second location may be ceased a predetermined duration after the detecting of the first of the plurality of mobile devices traveling to the second location while the second of the plurality of mobile devices remains at the first location.

An indication of a selection to perform said transmission of the data detected by the second of the plurality of mobile devices at the first location to the first of the plurality of mobile devices at the second location may be received. The indication of the selection to perform the transmission of the data detected by the second of the plurality of mobile devices at the first location to the first of the plurality of mobile devices at the second location may be received at least one of before the detecting of the plurality of mobile devices at the first location (e.g., via a device or application setting) or after the detecting of the plurality of mobile devices at the first location.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, computing devices, including mobile devices such as mobile (or cellular and/or smart) phones, PDAs, tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
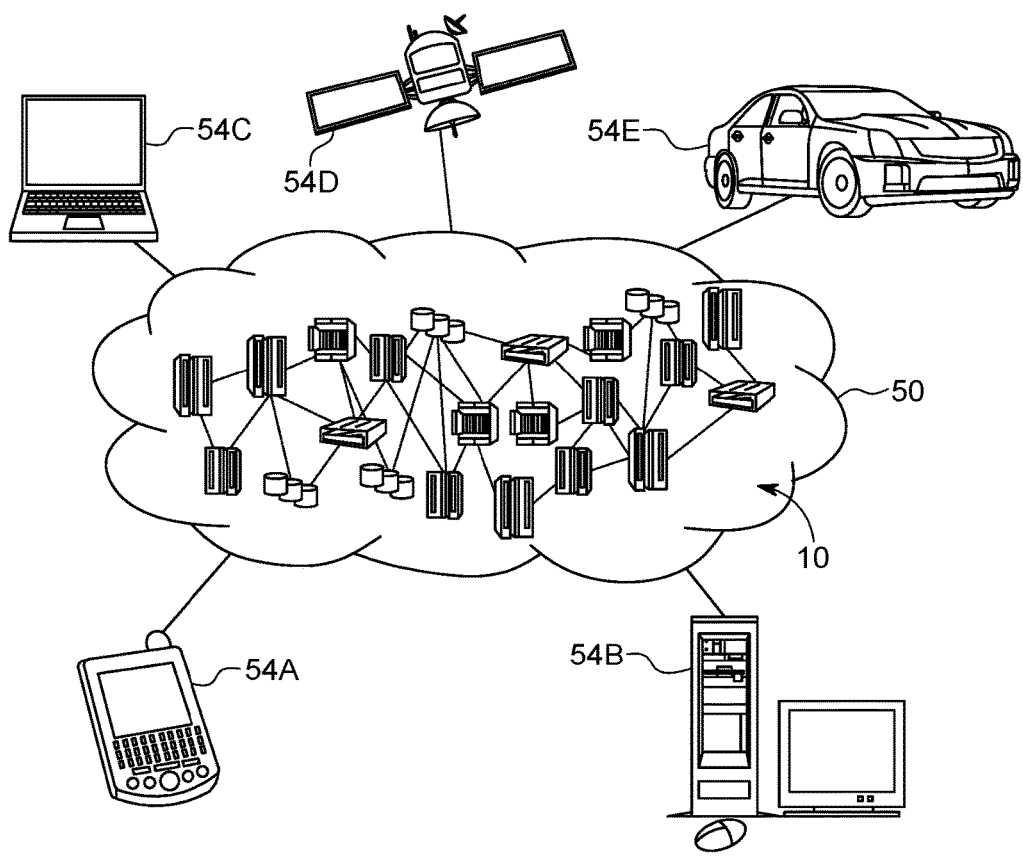
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, satellites (e.g., GPS satellites) 54D, and vehicles (e.g., automobiles, aircraft, watercraft, etc.) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
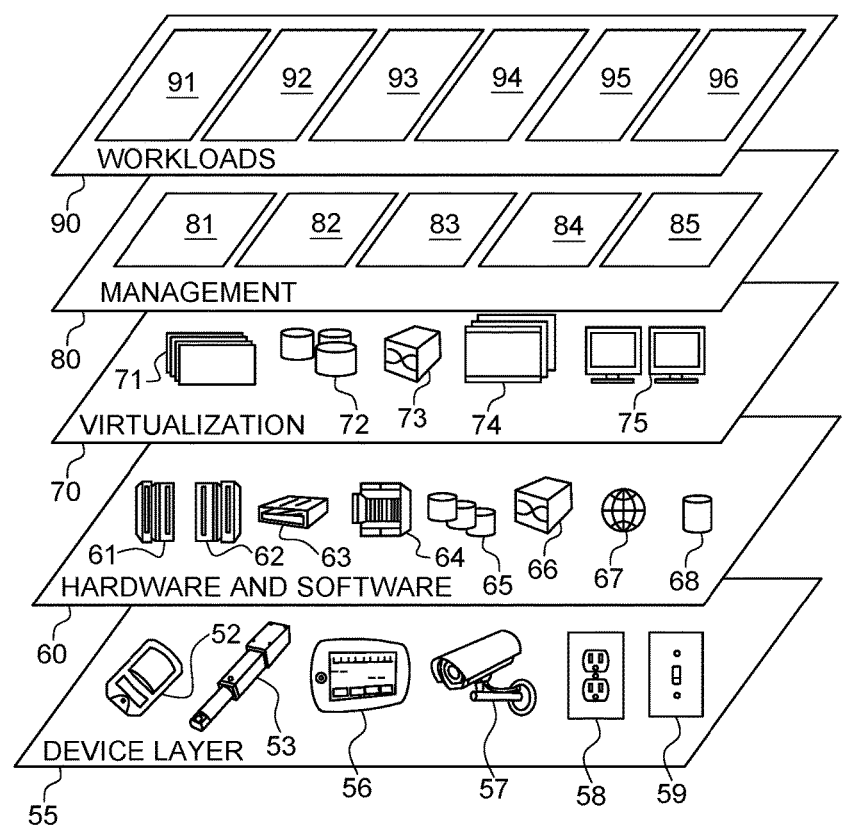
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to mobile devices, computing systems within vehicles (e.g., automobiles, aircraft, watercraft, etc.), and satellites (e.g., GPS satellites), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing mobile devices as described herein. One of ordinary skill in the art will appreciate that the workloads and functions 96 for managing mobile devices may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing mobile devices. A plurality of mobile devices are detected at a first location (and/or within a predetermined distance/range of each other). After the plurality of mobile devices are detected at the first location, a first of the plurality of mobile devices is detected traveling to a second location (and/or beyond the predetermined distance/range) while a second of the plurality of mobile devices remains at the first location. In response to the plurality of mobile devices being detected at the first location and the first of the plurality of mobile devices being detected traveling to the second location while the second of the plurality of mobile devices remains at the first location, data detected by the second of the plurality of mobile devices at the first location is enabled to be transmitted to the first of the plurality of mobile devices at the second location.

In other words, in some embodiments, when multiple mobile devices are detected as being at one location (e.g., at a meeting, a conference, a social gathering, or other event), and one (or more) of the devices is detected as leaving the location, data (e.g., audio and/or video) detected by one or more of the mobile devices still at the location is transmitted to (and rendered by) the mobile device that has left the location, perhaps seamlessly/automatically. In this manner, a user of the device that has left the location may still participate in the event(s) at the location by listening to and/or viewing the data transmitted by the device(s) still at the location. The transmission of data may be "two-way" such that the user of the device that has left the location may actively participate (e.g., take part in conversations with people still at the location).

Figure 4:
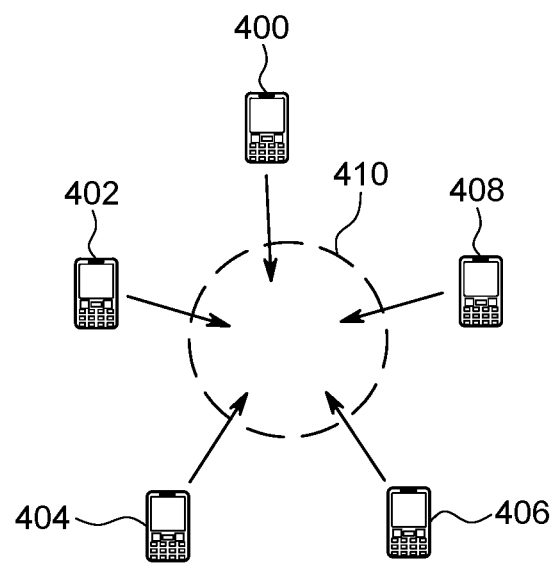
FIGS. 4-9 are simplified plan views showing the locations of multiple mobile devices with respect to a location in accordance with various aspects of the present invention.

FIGS. 4-9 are simplified illustrations showing the positions and/or movements of mobile devices 400-408 with respect to a (first) location 410, depicting various aspects of functionality according to some embodiments described herein. Referring specifically to FIG. 4, mobile devices 400-408 are shown as traveling to/moving towards (or converging at) location 410. The location(s) of the mobile devices 400-408 may be determined using GPS or any other suitable method.

Each of the mobile devices 400-408 may be, for example, any type of suitable portable computing device, such as, but not limited to, mobile (or cellular and/or smart) phones, PDAs, tablets, wearable technology devices, laptops, handheld game consoles, portable media players, etc., as well as computing systems in vehicles, such as automobiles, aircraft, watercrafts, etc. However, although the computing devices described herein are generally referred to as mobile devices, it should be understood that in some embodiments, one or more of the computing devices utilized may be relatively stationary (e.g., PCs, servers, etc.). Additionally, although five mobile devices 400-408 are shown, it should be understood that different numbers of mobile devices (e.g., less or more than five) may be utilized.

The location 410 may be any location (and/or event) at which multiple mobile devices (and/or the users thereof) may converge. Examples include, but are not limited to, events such as meetings, conferences, social gatherings, teleconferences, etc. and/or any suitable locations for such events. However, in some embodiments, the location 410 may simply refer to a distance or range in which the mobile devices 400-408 are located which may initiate some of the functionality described herein. This distance/range may be any suitable distance depending on the exact conditions (e.g., 20 ft, 100 ft, etc.) and may vary in different embodiments (e.g., the range may be set by a user and/or system preference). Further, although location (or range) 410 is shown as being stationary, it should be understood that location 410 may be moving (e.g., if some or all of the mobile devices 400-408 are moving together, such as, on/in a vehicle).

Figure 5:
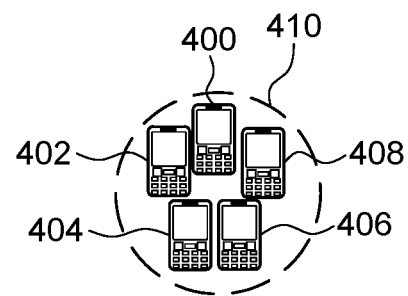

As shown in FIG. 5, the mobile devices 400-408 have converged at location (and/or within range) 410. In some embodiments, the functionality described below is only initiated if the mobile devices 400-408 remain at location 410 for a predetermined amount of time or duration (e.g., 30 seconds, 1 minute, etc.), which may be selected by a user or system/application setting. While at location 410, the mobile devices 400-408 may be able to detect various types of data related to any activity/event occurring at location 410. For example, the mobile devices 400-408 (at least some of the mobile devices 400-408) may be able to detect audio and/or video data (e.g., sounds, such as human voices or recorded messages, and/or visual events, such as a presentation) using various sensors on the mobile devices 400-408, such as microphones and/or cameras.

Figure 6:
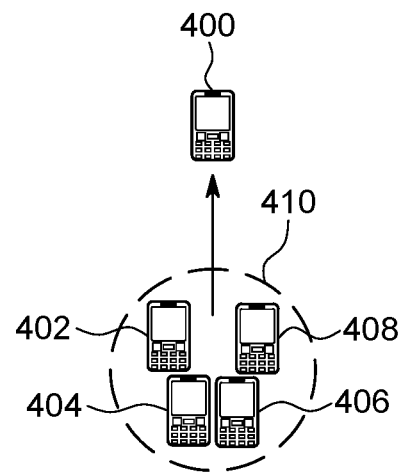

Referring now to FIG. 6, mobile device 400 (perhaps with the user thereof) leaves location 410 (and/or moves outside of the range described above). For example, if the location 410 corresponds to a conference room in which a meeting is taking place, the user associated with mobile device 400 may have to unexpectedly leave the meeting (i.e., mobile device 400 and/or the user thereof moves to a second location).

Figure 7:
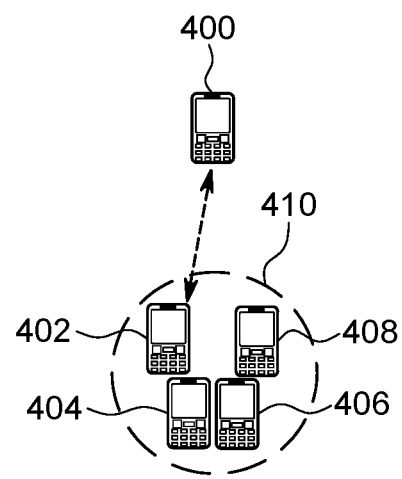

In some embodiments, when one (or more) of the mobile devices 400-408 is detected as leaving location 410, the transmission of data (e.g., audio and/or video data) detected by the mobile devices 400-408 still at the location 410 to the mobile device(s) that have left location 410 is enabled. For example, as shown in FIG. 7, data detected by mobile device 402, which is still at location 410, is transmitted to mobile device 400, which may appropriately render the data to the user thereof (e.g., via one or more speakers and/or display devices). In this manner, the user of mobile device 400 may still be able to observe/participate/take part in the activity/event taking place at location 410. In some embodiments, the transmission of data may (also) be performed in the opposite manner, such that data detected by mobile device 400 may be transmitted to (and rendered by) one or more of the mobile devices still at the (first) location 410, such as mobile device 402.

For example, the user of mobile device 400 may be able to continue speaking to (or with) other users still at location 410 via mobile device 402 (e.g., a speaker phone type functionality, headsets, ear pieces, etc.), which may in effect operate as a "surrogate" for mobile device 400 at location 410. The particular mobile device(s) still at location 410 that is utilized may be selected by, for example, the proximity of the mobile devices 400-408 when all of the mobile devices 400-408 were at location 410 (e.g., mobile device 402 may be selected because it was the closest to mobile device 400 when mobile device 400 was at location 410). As another example, the particular mobile device may be selected via user preference, previous communications, the presence of the particular use on a contacts list, social media relationships, etc. In some embodiments, multiple mobile devices that remain at location 410 are utilized (e.g., one of the mobile devices 402-408 may operate as a primary surrogate which relays data to the other mobile devices 402-408 still at location 410).

In some embodiments, before the transmission of data described above takes place, an indication of a selection to have such functionality performed is received. As one example, referring again to FIG. 6, while the user of mobile device 400 is still at location 410 (e.g., after he/she has determined that he/she needs to leave the meeting early and before he/she has left location), he/she may create an audio (and/or video) reference point, or "lock" mobile device 400 to location 410, by an appropriate input on mobile device 400, such as a gesture on a touchscreen of the mobile device 400, a verbal command, etc., while he/she is still at location 410. In such an embodiment, after such an indication has been received, the transmission of data described above may be initiated when mobile device 400 leaves location 410, perhaps automatically (e.g., with no additional action required by the user of device 400).

As another example, the selection to have such functionality initiated may be set in a device, operating system, and/or application setting (e.g., user selected or default setting). In such embodiments, the mobile device(s) may be configured to detect when conversations are taking place (e.g., via a microphone) and automatically initiate the transmission of data described above when the mobile device moves away from the location at which the conversation was taking place. Alternatively, the user of the mobile device (e.g., mobile device 400) may be provided with an indication/notification (e.g., via an audio alert, a message on the display screen, etc.) that such functionality is possible and/or imminent, along with the option of whether or not to perform the transmission or cancel it.

Similarly, in some embodiments, the mobile device(s) (and/or the users thereof) that remain at the location may (also) provide an indication of a selection to have such functionality performed. For example, the selection to have such functionality initiated may be set in a device, operating system, and/or application setting, or alternatively, the user(s) of the mobile device(s) may be provided with an indication/notification (e.g., via their own mobile device and/or the mobile device of the user leaving the location) that such functionality is possible and/or imminent, along with the option of whether or not to perform the transmission or cancel it. For example, referring to FIGS. 6 and 7, after mobile device 400 is detected as having left location 410 (and/or after the user of mobile device 400 has set location 410 as an audio/video reference point), the user of mobile device 402 (and/or mobile devices 404-408) may be provided with an indication/alert that mobile device 400 (and/or the user thereof) will remain in contact with the activity occurring at location 410, and perhaps be provided with an option to cancel such functionality.

Referring again to FIG. 7, the transmission of data between the mobile devices still at the location and the mobile device that has left the location may continue as long as possible. In some embodiments, the transmission of data continues even if a predetermined number of the mobile devices 402-408 move to a new location, but remain within the predetermined distance of one another (e.g., a meeting is moved from one conference room to another).

Figure 8:
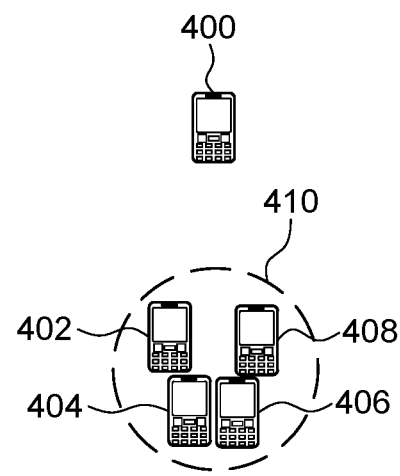

However, in some embodiments, the transmission is ceased after a predetermined amount of time (e.g., set by user preference, system/application settings, etc.), as is shown in FIG. 8. For example, the user of mobile device 400 and/or mobile device 402 (or mobile devices 404-408) may wish to terminate the transmission of data after a certain amount of time, such as 30 minutes or 1 hour.

In some embodiments, the transmission of data is ceased if the mobile device(s) that has left the location returns, and perhaps remains for a predetermined amount of time. For example, if mobile device 400 returns to location 410 (and perhaps remains for 30 seconds, 1 min, etc.), the transmission may be ceased (i.e., the user has returned to the event). Also, the transmission of data may be ceased if a particular number of mobile devices leave location 410. For example, if the event occurring at location 410 ends, and a predetermined number of the remaining mobile devices (e.g., two or three) leave location 410, the transmission of data may be ceased. As another example, the user of mobile device 400 (and/or the users of any of the other devices 402-408) may end the transmission of data by, for example, selecting an option on his/her mobile device (e.g., via touch/text, voice command, etc.).

Figure 9:
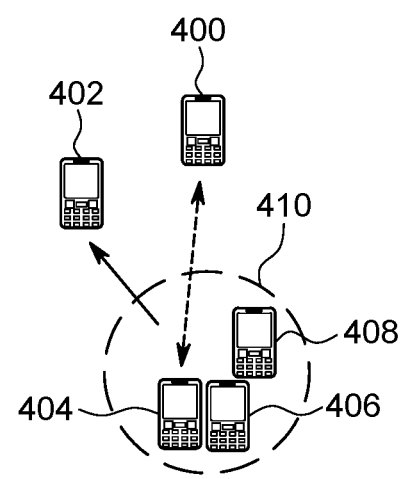

As shown in FIG. 9, in some embodiments, if the mobile device utilized at the location (also) leaves, another mobile device may be selected to continue with the transmission of data. For example, as shown in FIG. 9, mobile device 402 has left location 410 while mobile devices 404-408 remain. In such a situation, a new surrogate mobile device, such as mobile device 404, may be selected to continue with the transmission of data with mobile device 400. Also, although not specifically shown, mobile device 402 may utilize similar functionality with one or more of mobile devices 404-408 so that the users thereof may continue to observe/participate in the event at location 410 in a manner similar to that described above.

In some embodiments, the functionality described herein may be initiated when multiple mobile devices are detected as being at a particular location (and/or within a predetermined distance of each other) while another device is at a second location. The arrangement of mobile devices shown in FIG. 8 may be used to illustrate such an embodiment. As shown in FIG. 8, mobile devices 402-408 are at location 410 while mobile device 400 is at a different (or second) location. As one example, if some, or all, of the users of mobile devices 402-408 are acquaintances (e.g., friends, coworkers, social media contacts, etc.) of the user of mobile device 400, the transmission of data as described above may be implemented so that the user of mobile device 400 may observe/participate in the event, conversation, etc. that is occurring at location 410.

Figure 10:
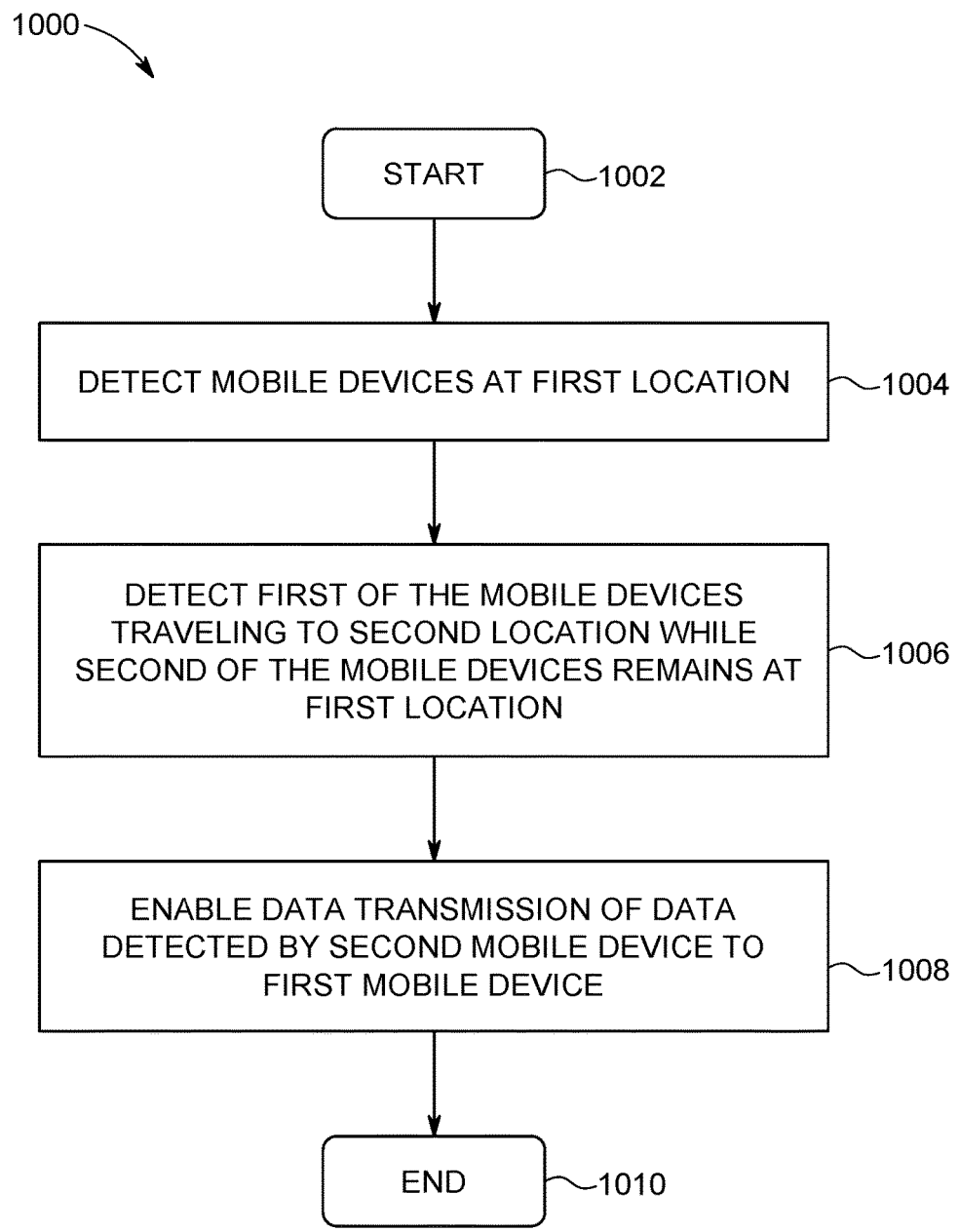
FIG. 10 is a flowchart diagram depicting an exemplary method for managing mobile devices in which various aspects of the present invention may be implemented.

Turning to FIG. 10, a flowchart diagram of an exemplary method 1000 for managing mobile devices, in which aspects of the present invention may be implemented, is illustrated. Method 1000 begins (step 1002) with, for example, a plurality of mobile devices (e.g., smart phones, PDAs, tablets, etc.) being activated and in use within the same general vicinity. In some embodiments, at least some of the mobile devices are configured to allow the transmission of data as described above (e.g., via a preference or setting on the device and/or applications on the device).

The plurality of mobile devices are detected at a first location (step 1004). As described above, the first location may be a location (and/or event) at which multiple mobile devices (and/or the users thereof) may converge. Examples include, but are not limited to, events such as meetings, conferences, social gatherings, teleconferences, etc. and/or any suitable locations for such events. However, in some embodiments, the first location may simply refer to a distance or range in which the mobile devices are located which may initiate some of the functionality described herein. This distance/range may be any suitable distance depending on the exact conditions (e.g., 20 ft, 100 ft, etc.) and may vary in different embodiments (e.g., the range may be set by a user and/or system preference).

One of the mobile devices (i.e., a first of the plurality of mobile devices) is then detected as traveling to a second location while at least one of the other mobile devices (i.e., a second of the plurality of mobile devices) remains at the first location (step 1006). As described above, the moving of the first of the mobile devices to the second location may correspond to the first mobile device moving outside of the distance/range previously referred to, and in some embodiments, at least some of the mobile devices may be moving. That is, the first location may move (e.g., some or all of the remaining mobile devices may relocate but remain within a predetermined distance of each other).

In some embodiments, in response to the mobile devices being detected at the first location and the first mobile device being detected as leaving the first location (and/or traveling to a second location), the transmission of data detected by the second mobile device (e.g., still at the first location) to the first mobile device at the second location (and/or vice versa) is enabled (step 1008). The transmitted data may be audio and/or video data. As described above, in this manner, the user of the first mobile device may be able to continue to observe and/or participate in an event taking place at the first location. In some embodiments (e.g., those in which the transmission functionality is previously opted for/selected via settings, etc.), the transmission of data in enabled automatically, as opposed to, for example, one of the users of the mobile devices attempting to contact another user via the mobile devices (e.g., by placing a phone call).

Method 1000 ends (step 1010) with, for example, the first mobile device (and/or the user thereof) returning to the first location, a predetermined duration expiring, or a certain number of the mobile devices that had remained at the first location leaving the first location, as described above. In some embodiments, the transmission of data may be manually ceased by one of the users (e.g., via text/touch command, voice command etc.).

Although not shown in FIG. 10, it should be understood that the data transmission may be initiated for multiple devices. For example, if the second mobile device (and/or the user thereof) leaves the first location, a third mobile device that is still at the first location may be utilized to transmit data to (and/or from) the first mobile device in a similar manner. Additionally, in some embodiments, the data transmission may be initiated without all of the mobile devices initially converging at the same location. For example, if multiple mobile devices that are associated with a particular user's mobile device (e.g., friends, coworkers, social media contacts, etc.) are detected as converging at a particular location (i.e., the first location) while the particular user's device is detected at another location (i.e., the second location), the transmission of data as described above may be implemented so that the user of mobile device 400 may observe/participate in the event, conversation, etc. that is occurring at the first location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing mobile devices, comprising:
   detecting a plurality of mobile devices at a first location, each of the plurality of mobile devices associated with a particular user;
   after the detecting of the plurality of mobile devices at the first location, detecting a first of the plurality of mobile devices traveling to a second location while a certain number comprising a majority of the plurality of mobile devices remains at the first location;
   in response to the detecting of the plurality of mobile devices at the first location and the detecting of the first of the plurality of mobile devices traveling to the second location while the certain number comprising the majority of the plurality of mobile devices remains at the first location, enabling data detected by a second of the plurality of mobile devices at the first location to be transmitted to the first of the plurality of mobile devices at the second location; wherein the second of the plurality of mobile devices further operates as a primary surrogate to relay the data to the remaining plurality of mobile devices at the first location, the second of the plurality of mobile devices chosen from the plurality of mobile devices as being a closest mobile device in physical proximity to the first of the plurality of mobile devices when the first of the plurality of mobile devices was at the first location; and wherein the data detected by the second of the plurality of mobile devices at the first location includes at least one of audio data or video data; and
   ceasing said transmission of the data detected by the second of the plurality of mobile devices at the first location to the first of the plurality of mobile devices at the second location a predetermined duration after the detecting of the first of the plurality of mobile devices traveling to the second location while the certain number comprising the majority of the plurality of mobile devices remains at the first location.

2. The method of claim 1, wherein the detecting of the plurality of mobile devices at the first location includes detecting the plurality of mobile devices within a predetermined distance of each other.

3. The method of claim 1, further including, in response to the detecting of the plurality of mobile devices at the first location and the detecting of the first of the plurality of mobile devices traveling to the second location while the certain number comprising the majority of the plurality of mobile devices remains at the first location, enabling data detected by the first of the plurality of mobile devices at the second location to be transmitted to the second of the plurality of mobile devices at the first location.

4. The method of claim 1, further including receiving an indication of a selection to perform said transmission of the data detected by the second of the plurality of mobile devices at the first location to the first of the plurality of mobile devices at the second location.

5. The method of claim 4, wherein said indication of the selection to perform said transmission of the data detected by the second of the plurality of mobile devices at the first location to the first of the plurality of mobile devices at the second location is received at least one of before the detecting of the plurality of mobile devices at the first location or after the detecting of the plurality of mobile devices at the first location.

6. A system for managing mobile devices, comprising:
   at least one processor that
      detects a plurality of mobile devices at a first location, each of the plurality of mobile devices associated with a particular user;
      after the detecting of the plurality of mobile devices at the first location, detects a first of the plurality of mobile devices traveling to a second location while a certain number comprising a majority of the plurality of mobile devices remains at the first location;
      in response to the detecting of the plurality of mobile devices at the first location and the detecting of the first of the plurality of mobile devices traveling to the second location while the certain number comprising the majority of the plurality of mobile devices remains at the first location, enables data detected by a second of the plurality of mobile devices at the first location to be transmitted to the first of the plurality of mobile devices at the second location; wherein the second of the plurality of mobile devices further operates as a primary surrogate to relay the data to the remaining plurality of mobile devices at the first location, the second of the plurality of mobile devices chosen from the plurality of mobile devices as being a closest mobile device in physical proximity to the first of the plurality of mobile devices when the first of the plurality of mobile devices was at the first location; and wherein the data detected by the second of the plurality of mobile devices at the first location includes at least one of audio data or video data; and
   ceases said transmission of the data detected by the second of the plurality of mobile devices at the first location to the first of the plurality of mobile devices at the second location a predetermined duration after the detecting of the first of the plurality of mobile devices traveling to the second location while the certain number comprising the majority of the plurality of mobile devices remains at the first location.

7. The system of claim 6, wherein the detecting of the plurality of mobile devices at the first location includes detecting the plurality of mobile devices within a predetermined distance of each other.

8. The system of claim 6, wherein the at least one processor further, in response to the detecting of the plurality of mobile devices at the first location and the detecting of the first of the plurality of mobile devices traveling to the second location while the certain number comprising the majority of the plurality of mobile devices remains at the first location, enables data detected by the first of the plurality of mobile devices at the second location to be transmitted to the second of the plurality of mobile devices at the first location.

9. The system of claim 6, wherein the at least one processor further receives an indication of a selection to perform said transmission of the data detected by the second of the plurality of mobile devices at the first location to the first of the plurality of mobile devices at the second location.

10. The system of claim 9, wherein said indication of the selection to perform said transmission of the data detected by the second of the plurality of mobile devices at the first location to the first of the plurality of mobile devices at the second location is received at least one of before the detecting of the plurality of mobile devices at the first location or after the detecting of the plurality of mobile devices at the first location.

11. A computer program product for managing mobile devices by one or more processors, the computer program product comprising a non-transitory computer-readable storage medium having computer-readable program code portions stored therein, the computer-readable program code portions comprising:

an executable portion that detects a plurality of mobile devices at a first location, each of the plurality of mobile devices associated with a particular user;

an executable portion that, after the detecting of the plurality of mobile devices at the first location, detects a first of the plurality of mobile devices traveling to a second location while a certain number comprising a majority of the plurality of mobile devices remains at the first location;

an executable portion that, in response to the detecting of the plurality of mobile devices at the first location and the detecting of the first of the plurality of mobile devices traveling to the second location while the certain number comprising the majority of the plurality of mobile devices remains at the first location, enables data detected by a second of the plurality of mobile devices at the first location to be transmitted to the first of the plurality of mobile devices at the second location; wherein the second of the plurality of mobile devices further operates as a primary surrogate to relay the data to the remaining plurality of mobile devices at the first location, the second of the plurality of mobile devices chosen from the plurality of mobile devices as being a closest mobile device in physical proximity to the first of the plurality of mobile devices when the first of the plurality of mobile devices was at the first location; and wherein the data detected by the second of the plurality of mobile devices at the first location includes at least one of audio data or video data; and an executable portion that ceases said transmission of the data detected by the second of the plurality of mobile devices at the first location to the first of the plurality of mobile devices at the second location a predetermined duration after the detecting of the first of the plurality of mobile devices traveling to the second location while the certain number comprising the majority of the plurality of mobile devices remains at the first location.

12. The computer program product of claim 11, wherein the detecting of the plurality of mobile devices at the first location includes detecting the plurality of mobile devices within a predetermined distance of each other.

13. The computer program product of claim 11, wherein the computer-readable program code portions further include an executable portion that, in response to the detecting of the plurality of mobile devices at the first location and the detecting of the first of the plurality of mobile devices traveling to the second location while the certain number comprising the majority of the plurality of mobile devices remains at the first location, enables data detected by the first of the plurality of mobile devices at the second location to be transmitted to the second of the plurality of mobile devices at the first location.

14. The computer program product of claim 11, wherein the computer-readable program code portions further include an executable portion that receives an indication of a selection to perform said transmission of the data detected by the second of the plurality of mobile devices at the first location to the first of the plurality of mobile devices at the second location.

15. The computer program product of claim 14, wherein said indication of the selection to perform said transmission of the data detected by the second of the plurality of mobile devices at the first location to the first of the plurality of mobile devices at the second location is received at least one of before the detecting of the plurality of mobile devices at the first location or after the detecting of the plurality of mobile devices at the first location.

\* \* \* \* \*